Feb. 10, 1959 A. DIEFENBACH 2,873,064
CENTRIFUGAL DECANTER WITH HORIZONTAL AXIS, SEPARATING
DRUM AND DISCHARGE OF RESIDUES BY MEANS OF A SCRAPER
Filed May 3, 1955
FIG. 1
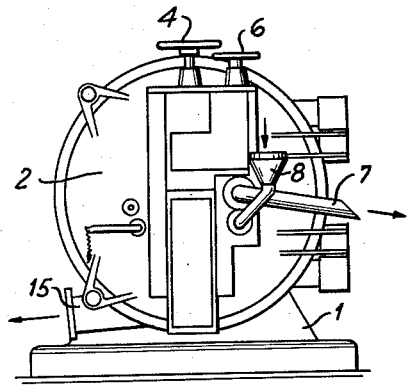
FIG. 2
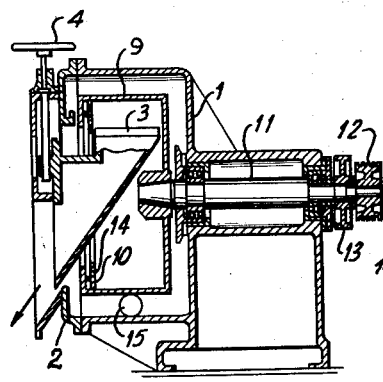
FIG. 3
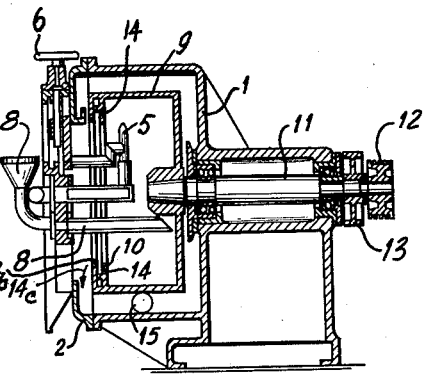
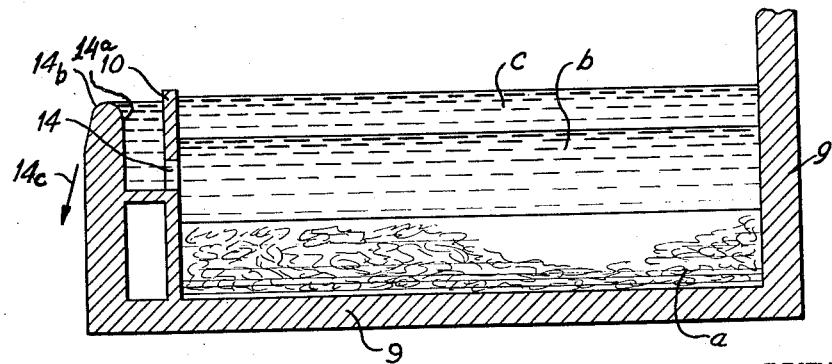
FIG. 4
INVENTOR.
ATTILIO DIEFENBACH
BY *[signature]*
AGT.

# United States Patent Office 2,873,064
Patented Feb. 10, 1959

2,873,064

CENTRIFUGAL DECANTER WITH HORIZONTAL AXIS, SEPARATING DRUM AND DISCHARGE OF RESIDUES BY MEANS OF A SCRAPER

Attilio Diefenbach, Monza, Italy

Application May 3, 1955, Serial No. 505,817

Claims priority, application Italy May 13, 1954

1 Claim. (Cl. 233—10)

The present invention relates to a separator or decanter for separating oily substances from olives.

It was heretofore the practice to employ hydraulic presses for treating olives so as to obtain oily substances therefrom. The so-called pressing systems were, however, not continuous, were time-consuming and required a lot of skilled labor in order to bring about sequential pressing operations.

It is further well known that the oily substance pressed out from olives is passed through filter elements whereby the oily juice thus obtained contains water from the fruit and a relatively small amount of impurities.

The efforts heretofore made to separate the solids from olives or like oil-containing fruit and further to separate the oily substances from the solids, and then the watery constituents from the oily juice led to complicated apparatus and uneconomical process steps, which the present invention contemplates to overcome.

It is therefore one of the objects of the present invention to provide means contributing to a simplified and a very efficacious centrifugal apparatus or like structure which readily permits the separation of the solids of the olives from its oily substance and the watery constituents of the latter to be continuously eliminated during the continuous operation of the centrifuge.

It is another object of the present invention to provide means taking advantage of certain properties and specific gravities of the constituents to be separated from each other in olives and like oil-containing fruits, whereby during a single operation the constituents will be separated and/or discharged from the apparatus.

Yet a further object of the present invention is to provide means facilitating a continuous treatment of oil-containing fruits to thereby obtain a stratification of the constituents of the fruits during centrifugal action imparted to the drum or like container of the apparatus.

Still another object of the present invention is to provide means reducing the loss of oily substance to a minimum in a centrifuge or like apparatus of the aforesaid type, in which in particular olives are treated for separating out the oily constituents thereof.

It is still a further object of the present invention to provide means affording formation of successive strata of solids, water, and oil in a drum of a centrifugal apparatus whereby, despite engagement and skimming of the oily subsatnce, no disturbances or turbulences will occur in the strata, since the removal of the water stratum will be automatically regulated due to the fact that the same is located intermediate said stratum of oil and said stratum of solids.

The above and other objects of the invention will become further apparent from the following detailed description, reference being made to the accompanying drawing showing a preferred embodiment of the invention:

Fig. 1 shows the decanter or centrifuge in front elevational view;

Figs. 2 and 3 are vertical longitudinal cross-sections, while

Fig. 4 shows on an enlarged scale a cross-section of the drum of the centrifuge with the diaphragm wall.

As seen in the drawing, the apparatus has a fixed casing 1, having a front cover or wall 2 carrying in turn a scraper 3 controlled by movable means in the form of an upright handwheel 4, a suction pipe 5 controlled by another movable means, such as the handwheel 6 and connected to a pipe 7 for discharging the sucked liquid, a pipe 8 for introducing oily juice to be separated, a horizontally rotating drum 9 provided with a separating diaphragm or inwardly extending flange-shaped end wall 10, a supporting drive shaft 11 for said drum, a control pulley 12 and a brake pulley 13. Operation of this apparatus is as follows: after filling the horizontal rotary drum 9 with water, the oily juice to be separated is introduced through the pipe 8 and supplied towards the bottom of said drum; owing to centrifugal force, the juice separates, according to the different specific gravities, into three horizontal strata or layers in the first and outermost layer, the heaviest part is collected, namely the solid material $a$; in the intermediate part, the water $b$; in the top or innermost part, the oil constituent $c$ (Fig. 4); on reaching the maximum level, the water flows out through the overflow forming intermediate orifices 14 provided in and located about midway of the height of the separating diaphragm 10 and is drained off from the space between said casing and said drum 9 outwards through the conduit 15 located in the casing 1, via a chamber 14$a$ formed between flange-shaped end wall 10 and flange member 14$b$ exteriorly of said drum 9 and connected to the latter according to arrow 14$c$, while the oil is conveyed outwards by the suction pipe 5 and thence by the discharge pipe 7. It will be noted that the diameter of the central aperture of flange member 14$b$ is larger than the diameter of the central opening of the flange-shaped end wall 10, so that the end of said flange member 14$b$ forms a weir and positive means to bring about overflow of the water constituent $b$ from the chamber 14$a$ toward the space between the drum 9 and the outer casing 1 thus avoiding the flow of the water constituent back to the interior of drum 9. Consequently, the water constituent can not flow when once discharged through the orifices 14 into the chamber 14$a$ for return to the interior of the drum 9 but will rather flow over the end of the flange member at 14$b$ according to arrow 14$c$. Therefore, the introduction of oily juice through pipe 8 is continued until the solid material is accumulated and attains a level defined by the lower edge of the orifices 14. At that time, the feeding of juice is discontinued, the oil and water contained in the drum 9 are discharged by way of pipe 5, actuating the handwheel 6, and, then, the solid part is discharged with the aid of the scraper 3 by actuating the handwheel 4. Then the scraper 3 is lowered again, the drum is filled with water and the introduction of juice is again started.

It can thus be seen, that there has been provided a centrifuge comprising a fixed casing, a drive shaft rotatably mounted in said casing, a hollow drum rotatable about a horizontal axis and located within said casing with a space formed between said drum and said casing, said drum being in driving connection with said drive shaft and having an inwardly extending flange-shaped end wall with a central opening, said flange-shaped end wall having a series of orifices therethrough, supply means extending through said opening into said drum for delivering a substance having solid, water and oil constituents which upon rotation of said drum about its horizontal axis form horizontal strata with said solid constituent located outermost and said oily constituent positioned innermost with respect to each other, said water containing constituent being disposed intermediate said stratum of oily constituent and said stratum of solid constituent and being in direct communication with said perforations, scraper means, suction means, both said scraper means and said suction means extending through said central opening into the interior of said drum, first movable means connected with said scraper means to displace said scraper means within said drum for contact with said stratum of solid constituent to facilitate removal thereof from said drum, second movable means connected to said suction means for placing said suction means in contact with and above said stratum of said oily constituent to facilitate withdrawal of said oily constituent from within said drum during rotation thereof, said first and second movable means being supported by said casing, and a flange member located exteriorly of and fixed to said end wall and forming a chamber between said flange member and said end wall, said chamber being connected via said orifices with the interior of said drum for receiving said water constituent through said orifices, said chamber opening toward said horizontal axis to permit said water constituent to overflow from said chamber into said space between said drum and said casing for discharge therefrom.

Various changes and modifications may be made without departing from the spirit and scope of the present invention and it is intended that such obvious changes and modifications be embraced by the annexed claim.

Having thus described the invention, what is claimed as new and desired to be secured by Letters Patent, is:

A centrifuge comprising a fixed casing, a drive shaft rotatably mounted in said casing, a hollow drum rotatable about a horizontal axis and located within said casing with a space formed between said drum and said casing, said drum being in driving connection with said drive shaft and having an inwardly extending flange-shaped end wall with a central opening, said flange-shaped end wall having a series of orifices therethrough, supply means extending through said central opening into said drum for delivering a substance having solid, water and oil constituents which upon rotation of said drum about its horizontal axis form horizontal strata with said solid constituent located outermost and said oily constituent positioned innermost with respect to each other, said water containing constituent being disposed intermediate said stratum of oily constituent and said stratum of solid constituent and being in direct communication with said orifices, scraper means, suction means, both said scraper means and said suction means extending through said central opening into the interior of said drum, first movable means connected with said scraper means to displace said scraper means within said drum for contact with said stratum of solid constituent to facilitate removal thereof from said drum, second movable means connected to said suction means for placing said suction means in contact with and above said stratum of said oily constituent to facilitate withdrawal of said oily constituent only from with in said drum during rotation thereof, said first and second movable means being supported by said casing, and a flange member located exteriorly of and fixed to said end wall and forming a chamber between said flange member and said end wall, said chamber being connected via said orifices with the interior of said drum for receiving said water constituent through said orifices and opening toward said horizontal axis, the inner peripheral edge of said flange member defining a central aperture of greater diameter than the diameter of said central opening, so that said water constituent in said chamber will overflow over said flange member into the space between said drum and said casing for discharge therefrom.

References Cited in the file of this patent

UNITED STATES PATENTS

| | | |
|---|---|---|
| 1,565,604 | Van der Molen | Dec. 15, 1925 |
| 1,754,774 | Sharples | Apr. 15, 1930 |
| 1,925,121 | Ter Meer | Sept. 5, 1933 |
| 2,692,725 | Hensgen | Oct. 26, 1954 |

FOREIGN PATENTS

| | | |
|---|---|---|
| 20,084 | Great Britain | A. D. 1914 |